United States Patent
Hogg et al.

(10) Patent No.: US 9,715,372 B2
(45) Date of Patent: Jul. 25, 2017

(54) EXECUTABLE GUIDANCE EXPERIENCES BASED ON IMPLICITLY GENERATED GUIDANCE MODELS

(71) Applicant: Microsoft Corporation, Redmond, WA (US)

(72) Inventors: Jason Hogg, Kirkland, WA (US); Joshy Joseph, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 13/802,612

(22) Filed: Mar. 13, 2013

(65) Prior Publication Data
US 2014/0282123 A1    Sep. 18, 2014

(51) Int. Cl.
*G06F 9/44*   (2006.01)
*G06F 3/0484*  (2013.01)

(52) U.S. Cl.
CPC .............. *G06F 8/35* (2013.01); *G06F 3/0484* (2013.01); *G06F 8/38* (2013.01)

(58) Field of Classification Search
CPC .. G06F 9/4443; G06F 3/0481; G06F 9/45512; G06F 8/30–8/38; G06F 8/73; G06F 8/74; G06F 3/0484; G06Q 10/06; G06Q 10/00
See application file for complete search history.

(56) References Cited

U.S. PATENT DOCUMENTS

| | | | | |
|---|---|---|---|---|
| 5,699,310 A * | 12/1997 | Garloff | ................ | G06F 9/4428 717/108 |
| 5,790,863 A * | 8/1998 | Simonyi | ................ | 717/113 |
| 5,966,532 A * | 10/1999 | McDonald | ................ | G06F 8/34 707/999.101 |
| 7,174,370 B1 * | 2/2007 | Saini et al. | ................ | 709/220 |
| 7,334,223 B2 * | 2/2008 | Kumar | ................ | G06F 8/36 717/104 |
| 7,496,888 B2 * | 2/2009 | Sanjar | ................ | G06F 8/34 717/100 |
| 7,640,540 B2 * | 12/2009 | Snover et al. | ................ | 717/135 |
| 7,716,634 B2 * | 5/2010 | Ross | ................ | G06F 9/4446 717/106 |
| 7,770,124 B2 * | 8/2010 | Argo | ................ | G06F 9/4443 707/999.004 |
| 7,853,923 B2 * | 12/2010 | Muenkel et al. | ................ | 717/106 |

(Continued)

OTHER PUBLICATIONS

Stroulia, E., et al., "User Interface Reverse Engineering in Support of Interface Migration to the Web," Automated Software Engineering, vol. 10, No. 3 [online], 2003 [retrieved Apr. 5, 2015], Retrieved from Internet: <URL: http://link.springer.com/article/10.1023/A:1024460315173>, pp. 271-301.*

(Continued)

*Primary Examiner* — Todd Aguilera
(74) *Attorney, Agent, or Firm* — Fiala & Weaver P.L.L.C.

(57) ABSTRACT

The subject disclosure is directed towards generating an intermediary (e.g., declarative) model based upon reflecting on and interpreting command line applications or the like, to represent a default user interface and default code transformation process. The intermediary model is modifiable to provide a customized output program. The models may be persisted, edited and otherwise modified to perform a management task, for example.

20 Claims, 4 Drawing Sheets

(56) References Cited

U.S. PATENT DOCUMENTS

| | | | | |
|---|---|---|---|---|
| 8,424,011 | B2* | 4/2013 | Barros | G06Q 10/06 717/104 |
| 8,527,939 | B2* | 9/2013 | Elad | G06F 9/4446 715/705 |
| 2003/0212438 | A1* | 11/2003 | Nova | G06F 19/3412 607/30 |
| 2005/0091525 | A1* | 4/2005 | Snover et al. | 713/200 |
| 2005/0160399 | A1* | 7/2005 | Kumar | G06F 8/36 717/104 |
| 2006/0184826 | A1* | 8/2006 | Argo | G06F 9/4443 714/27 |
| 2006/0228654 | A1* | 10/2006 | Sanjar | G06F 8/34 430/438 |
| 2007/0006121 | A1 | 1/2007 | Jezierski et al. | |
| 2007/0168929 | A1* | 7/2007 | Larvet | G06F 8/10 717/104 |
| 2007/0234274 | A1* | 10/2007 | Ross | G06F 8/34 717/101 |
| 2007/0245319 | A1* | 10/2007 | Muenkel et al. | 717/136 |
| 2008/0301684 | A1* | 12/2008 | Barros | G06Q 10/06 718/102 |
| 2009/0158153 | A1 | 6/2009 | Courteaux | |
| 2009/0254881 | A1 | 10/2009 | Johnson et al. | |
| 2010/0313182 | A1 | 12/2010 | Chen et al. | |
| 2011/0023022 | A1* | 1/2011 | Harper | G06F 8/36 717/170 |
| 2011/0047526 | A1* | 2/2011 | Olkhovich | G06F 8/00 717/104 |
| 2011/0296377 | A1 | 12/2011 | Morozov et al. | |
| 2012/0096527 | A1 | 4/2012 | Pasternak | |
| 2012/0102489 | A1 | 4/2012 | Staiman et al. | |
| 2012/0272146 | A1* | 10/2012 | D'Souza | G06F 3/0484 715/707 |
| 2013/0117277 | A1* | 5/2013 | Joseph et al. | 707/748 |
| 2013/0117668 | A1* | 5/2013 | Joseph et al. | 715/708 |
| 2014/0129532 | A1* | 5/2014 | Hogg et al. | 707/705 |
| 2014/0129533 | A1* | 5/2014 | Hogg et al. | 707/705 |
| 2014/0129934 | A1* | 5/2014 | Hogg et al. | 715/708 |

OTHER PUBLICATIONS

Phanouriou, et al., "Transforming Command-Line Driven Systems to Web Applications", In Journal of Computer Networks and ISDN Systems, vol. 29, Issue 8-13, Sep. 1997, 11 pages.

"AWS Tools for Windows PowerShell", Available at: http://awsdocs.s3.amazonaws.com/powershell/latest/aws-pst-ug.pdf, Feb. 4, 2013, 36 pages.

International Search Report and Written Opinion for PCT/US2014/021415, mailed Oct. 13, 2014, 19 pages.

Driscoll, Adam, "Microsoft Windows PowerShell 3.0 First Look", PACKT Publishing, Oct. 2012, 76 pages.

Hoffman, et al., "fgui: A Method for Automatically Creating Graphical user Interfaces for Command-Line R Packages", Journal of Statistical Software, Apr. 28, 2009, Available at <http://www.jstatsoft.org/v30/i02/paper>, 14 pages.

Letondal, Catherine, "A Web interface generator for molecular biology programs in Unix", Bioformatics, vol. 17, No. 1, Jan. 2001, 10 pages.

Schramm, et al., "Rapid UI Development for Enterprise Applications: Combining Manual and Model-Driven Techniques", Springer: Model Driven Engineering Languages and Systems, Oct. 2, 2010, 16 pages.

"International Preliminary Report on Patentability Issued in PCT Application No. PCT/US2014/021415", Mailed Date: Jul. 14, 2015, 12 Pages.

"Office Action Issued in European Patent Application No. 14713699.8", Mailed Date: Nov. 7, 2016, 4 Pages.

* cited by examiner

EXECUTABLE GUIDANCE EXPERIENCES BASED ON IMPLICITLY GENERATED GUIDANCE MODELS

BACKGROUND

Command line applications (such as the Powershell® cmdlets, DOS batch files or SQL command) enable a user to execute functionality from a textual command line. To perform meaningful execution, the user needs an understanding of the set of input parameters that apply and the valid range of values for each parameter For some programming languages, it is possible to reflect on the command line application and automatically generate a user interface, thus enabling a non-command line user or a novice to execute the functionality via the automatically generated user interface, even though the original application did not include a user interface. For example, Powershell® 3.0 includes "ShowCommand" functionality that serves this purpose.

However, such existing reflection functionality is designed to be very general, so that the generated user interface widely applies to many scenarios. As a result, this "one size fits all" form of user interface generation works for simple scenarios, but is inadequate for many other scenarios.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an intermediary model is generated from a program that takes as inputs one or more input parameters and one or more commands. The intermediary model comprises a user interface template corresponding to a default user interface and a code template corresponding to a default transformation program. The intermediary model may be maintained in memory to allow modification of the intermediary model into a modified model that includes modified user interface data and/or modified code. A modified program corresponding to the modified model is output.

In one aspect, a model generator program is configured to process an input program into an intermediary model comprising a user interface template and a code template comprising declaratives. The model generator program persists the intermediary model to provide for editing the intermediary model into a modified model that is configured to be interpreted or compiled into an executable program.

In one aspect, an intermediary model comprising a user interface template corresponding to a default user interface and a code template corresponding to a default transformation program is generated. A modified model that is based upon the intermediary model is persisted, in which the modified model includes a modified user interface data, at least one modified parameter, one or more flow conditions and/or one or more rules that is/are not specified in the intermediary model.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards reflecting on and interpreting command line applications (or commandlets or modules), and then composing an intermediary (e.g., declarative) model used for composing user interface models. In one implementation, an intermediary model is generated to represent a default user interface and default code transformation process. The intermediary model is defined using primarily declarative-based mechanisms Thus, rather than simply generating a user interface, the technology described herein generates an intermediary model that may then be displayed using a display user interface layout manager and code transformation process, for example. Moreover, the intermediary model may be persisted and modified by end-users, thus enabling customized guidance experiences. When the intermediary model is specified in a declarative manner, non-developers are able to modify the default behavior of the user interface, and people are able to share this work.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers and management tooling in general.

Figure 1:
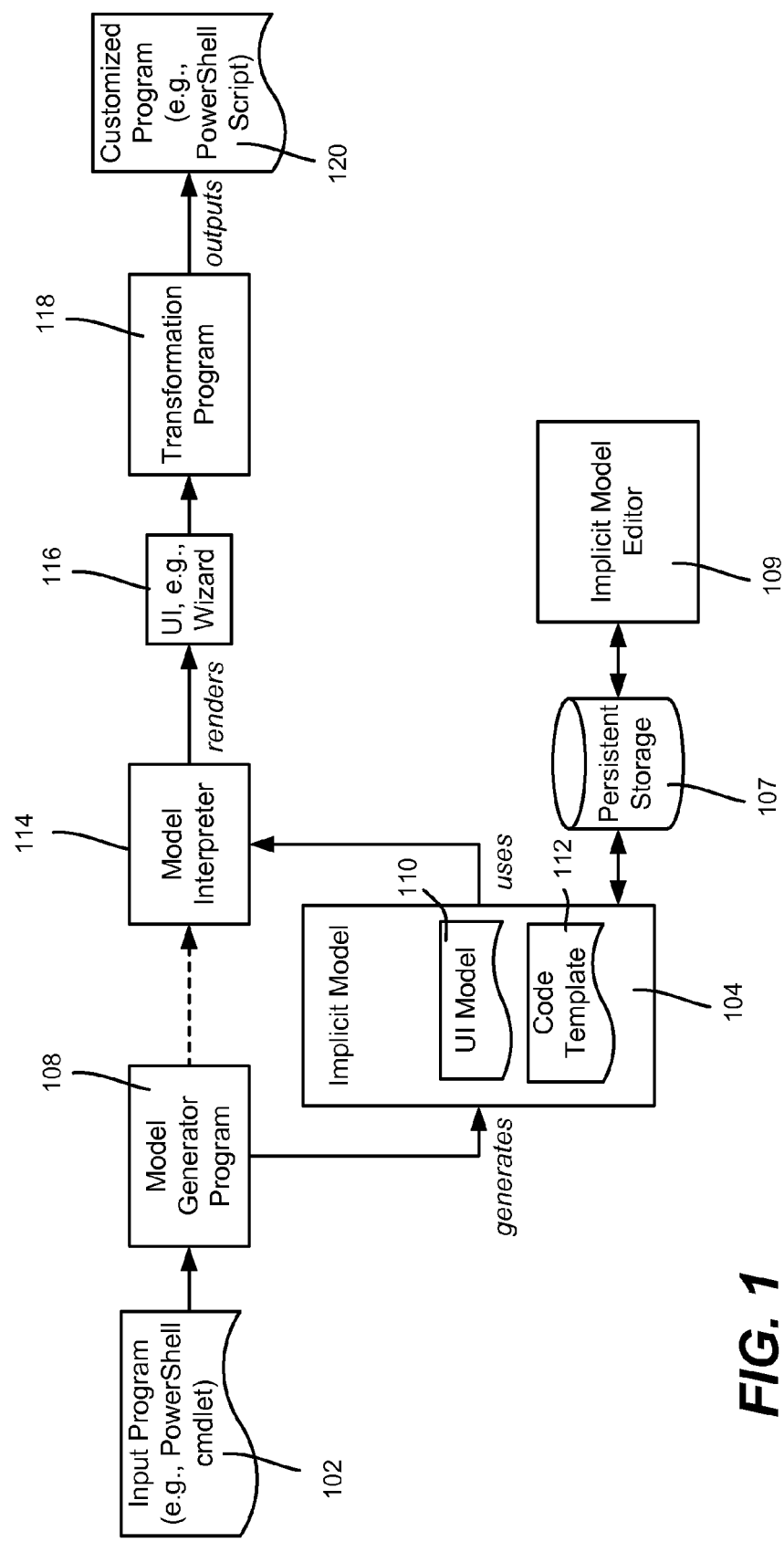
FIG. 1 is a block diagram including components configured to generate a model from an input program, to provide a modified/customized output program, according to one example embodiment.

FIG. 1 shows a block diagram comprising an example implementation in of a three-stage process for taking an input program 102 (e.g., a Windows® Powershell® cmdlet) and generating a model 104 (implicit model), which is then used as the basis for rendering a wizard 116, for example. The model 104 may be discarded (not persisted), or instead persisted (e.g., as represented via persistent storage 107) so as to allow a user to modify the user interface (UI), the validation logic and/or the code template used for generating code. Note that the UI model may be hard coded, or automatically inferred, e.g., from the cmdlet. Automatically inferred models may be edited, e.g., for customization, e.g., as represented by the model editor 109 in FIG. 1, which may be a text editor for text-based models or those able to be converted to text, and/or an editor with additional functionality, such as a graphical user interface with features that assist with editing the model.

In this example, the user executes a model generator program 108 which takes as an input program 102 (e.g., the Windows® Powershell® cmdlet) for which a UI is to be generated. The program 108 may reflect on the signature of the cmdlet function, the number of parameters, the types of these parameters and whether they are optional or mandatory, for example. This information is then used by the model generator program 108 to generate a default UI model 110 (e.g., an Extensible Application Markup Language (XAML)-based form, such as defining a set of pages in text files and how they interact with each other, e.g., an introduction page, interaction page and error-handling page) and appropriate input validation logic. The information is also used to generate a default code template 112, e.g., having code in declarative form such as XAML-based.

Note that in extensible scenarios, the model generator program 108 presents the generated model to the user to decide on single cmdlet versus a pipeline or a workflow. This user input allows for composing complex application execution scenarios.

Figure 2:
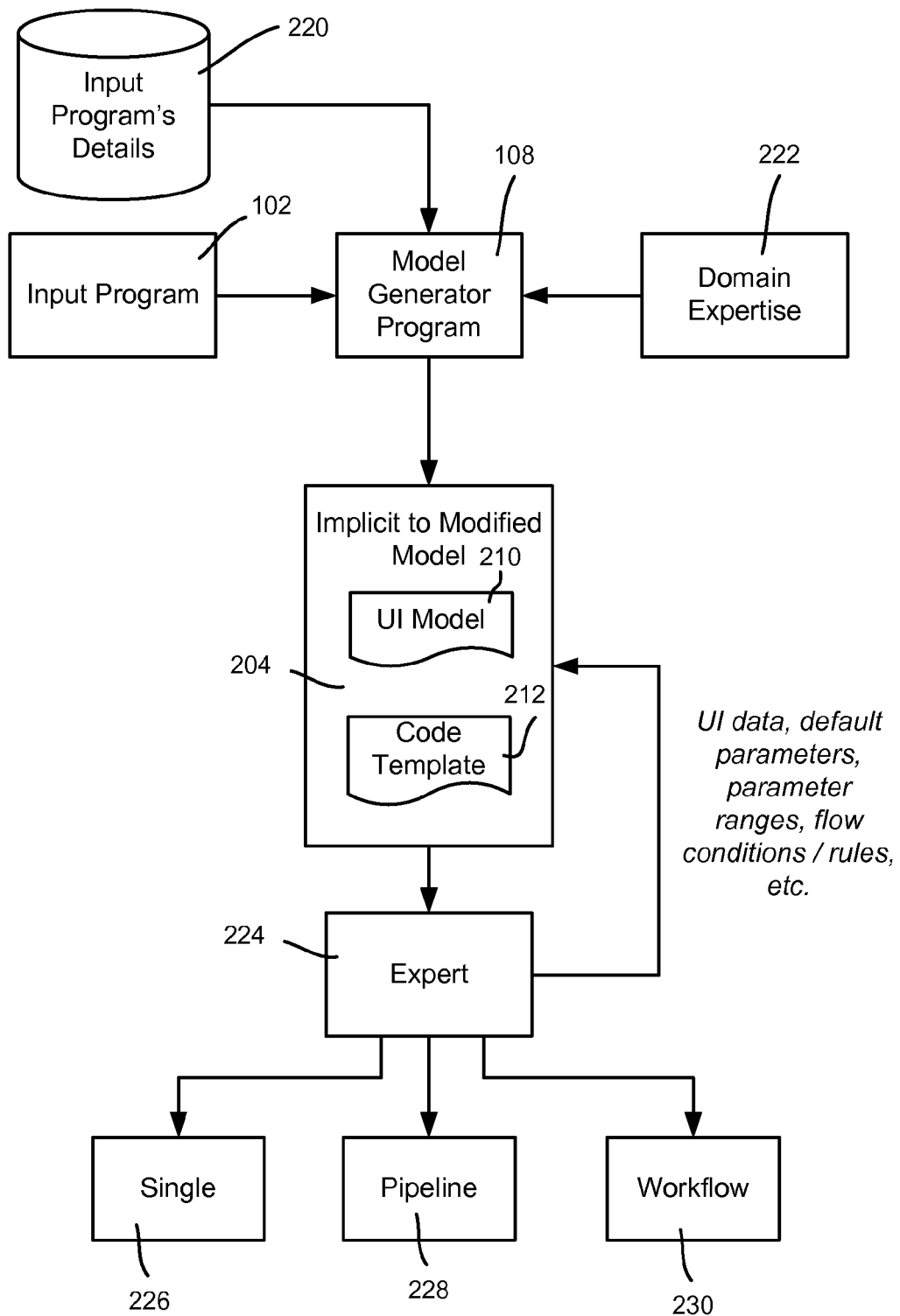
FIG. 2 is a block diagram representing the modification of an intermediary model into a modified model, according to one example embodiment.

This is exemplified in FIG. 2, where the model generator program 108 inputs details regarding the input program 102 from a source 220, (which may be learned from the program itself or separately), e.g., what the input program can take as parameters, what the valid ranges of those parameters are, and so forth. Domain expertise 222 further may be used to determine which of those parameters are applicable to a given task, and, for example, adjust the model generation program 108 to generate the implicit model 104 with a UI model 210 that applies to the task, possibly limiting the parameters, parameter ranges, setting suitable default values, and so forth.

Once the implicit model 104 is generated, it may be persisted or otherwise accessed by an expert 224 or the like (who also may provide some or all of the domain expertise 222). In this way, experts can further customize and provide default parameters and flow conditions/rules as desired to the model 104.

The expert 224 may modify the code template 212 and/or UI model 210 for other purposes, e.g., to reuse a UI with a translated language, a different company name, and so on. The expert may add flow conditions and other rules to the code template 212, as generally described below with reference to FIG. 3, The expert 224 (or even a slightly skilled user) also may determine whether to use the model in a single operation 226, or implement it as part of a pipeline 228 or other workflow 230. For example, the model 204 may be used to present a wizard to a user to obtain user-entered values, with the result of running the program with those wizard-obtained values chained to another program (e.g., in series or possibly conditionally selected, (e.g., with the output used to determine a branching direction), which in turn may obtain more data and/or performs more processing, and so on, to produce a final output.

Returning to FIG. 1, a model interpreter 114 may take the generated model 104 (comprising the UI model 110 and template 112) and execute the model 104, providing a wizard 116 (e.g., a single page) or the like to an end-user within which to enter input parameters. Users may extend this model to include guidance topics, examples and links to knowledge articles, for example.

After the user completes the wizard 116, a transformation program 118 takes the input parameters and inserts them into the code template 112 via transformation. This results in a modified (e.g., customized) program 120 (e.g., a Windows® Powershell® script or a pipeline of Windows® Powershell® scripts that are executable by the Windows® Powershell® interpreter). Each script can be shown to the user prior to execution or executed transparently. The artifacts generated by these processes such as UI Wizards, associated models and context may be collectively referred to herein as guidance packages.

In general and as described above, a given model generator program (e.g., 108) is typically configured with domain expertise 222 that enables the model generator program 108 to know what to look for in its input objects (e.g., parameters and types of parameters for PowerShell®, HTML domain object model, or DOM, for forms and so on), such that the model generator program 108 can then generate an appropriate model.

By way of example, consider a model generator that is designed for web forms, e.g., an HTML form that is used to provide credit card information for an e-commerce site. The model generator is programmed to incorporate domain expertise, such that it is able to recognize input controls that are relevant to this process and then build a model. That model (conceivably) may be used on other ecommerce sites, except that in many cases the forms will have different naming conventions. Thus, a user may modify the model such that the model alters its behavior on different sites. The model interpreter thus may be provided with the ability to customize behavior depending on who the host is.

As another example, consider a deployment process in which someone deploying a product has to type a large number of commands into a command line interface in order to have the deployment solution install. Each of these commands has different points of variability, and some of these will be significant for someone else that also may want to perform that same set of actions (e.g., steps).

In such an instance, a model generator may be configured to "record" the actions being performed, and use the recorded information to generate a model that makes it possible for an advanced user to then go and remove/customize/add to those steps based on an understanding of what is possible at each of the steps. It is feasible to have a model generator that is taught how to look for this expertise in a general class of problems, e.g., a model generator that works across multiple command line environments and is able to infer characteristics about these environments, which it may then use to support implementation in a specific class of command line environments.

Turning to another aspect, users may want to customize the behavior of the UI, e.g., to enable a standardized guidance experience within an organization or across a type of user. As described herein, this may be done via editing or similar interaction to provide a customized program for a command line application. Moreover, customization may be further extended to enable more complex execution scenarios, such as where the user may need to execute a workflow having of a sequence of command line applications. This is based upon chaining of command line applications, where the inputs may be collected in each step of execution based on the conditions involved.

Moreover, the user interface model does not need to be sequential as in the example of a wizard. Instead, the implicit model may include internal branching logic, (as well as be coupled for input from and/or output to other models). For example, for a debit card, the user interface may branch to another page or the like to obtain the user's debit card PIN, whereas for a credit card, the user interface may branch to another page to obtain some form of credit card signature or validation data such as expiration date/security code. The user interface model also may be configured to automatically gather data from other sources, e.g., for automated balance checking, credit check approval, and/or the like.

Figure 3:
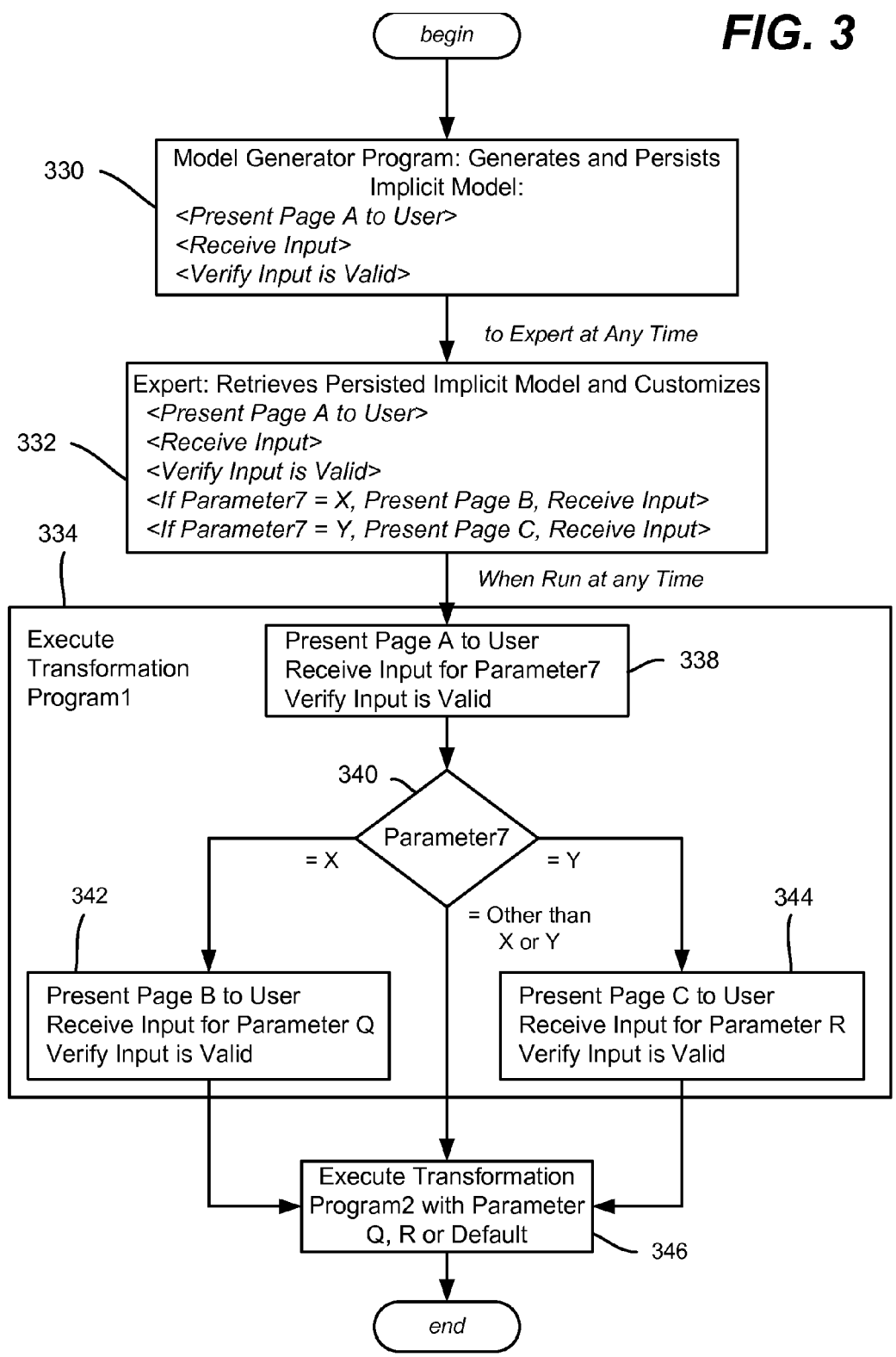
FIG. 3 is a flow diagram representing modification of a model, and resulting execution of a corresponding program, according to one example embodiment.

FIG. 3 is a simplified example in which a model generator program outputs a model 330, with simplified code template "commands" shown for readability (instead of the actual page rendering code, input code and validation code, for example). At any time, an expert may modify the code template, such as to add branching conditions, as represented via block 332.

When the code in block 332 is run as Transformation program1, as represented via block 338, the code will present page A to the user to receive input for the specified parameter associated with page A, namely Parameter7. Note that via the model, input parameters need not be limited to standard command line input such as single values, but may include complex parameters such as name/value pair (maps to literal/text field) displays, e.g., arrays, collections of variably typed information, XML structures and so forth.

Based upon the user input, at step 340 of Transformation program1 334, the value entered determines the next page to output, e.g., Page B for Parameter7=X, Page C for Parameter7=Y, or no further page for Parameter7 equal to something other than X or Y, e.g., default values are used for output.

If Page B is output at step 342, this page collects a value for a parameter Q. If instead page C is output at step 344, this page collects a value for a different parameter R.

In the example of FIG. 3, the Transformation program1 334 is chained to (outputs its results to) Transformation program2 346, which consumes the output as its input. Thus, in this simplified example, Transformation program2 346 executes with the value for parameter Q plus default values for any other parameters, or with the value for parameter R plus default values for any other parameters, or with all default values. As can be seen, an initial model may be modified to include other code, including branching logic and the like, and the modified model may be coupled to (e.g., chained to) one or more other models. Note that instead of a serial chain or pipeline, a model may selectively branch between other models in a workflow or the like based upon its output, e.g., via intervening logic, which may itself be a model. Thus, an expert may build one or more execution paths within a model, and couple that model to other existing or modified models, in a straightforward manner.

As can be seen, the technology (e.g., tooling) described herein removes the typical constraints (e.g., hard coded wizards with no insight into execution logic) that typically accompanies management tools. Branching logic, different user interfaces, and the like allow different combinations of parameters to be used to execute different functionality. Also, input parameters may have complex interdependencies not easily inferred through conventional command-line reflection.

In addition, the technology helps in compiling complex applications with greater confidence, as well as removing cumbersome/complex issues. For example, users of command line applications normally get guidance help from explicit invocation of the desired command with proper help parameters (–help option or '?'). This is cumbersome for complex command line applications where the user needs guidance, sample scripts/snippets, and/or knowledge articles along the way, including for example, an option to execute the application in a sandbox and see the results. This technology helps to inject proper guidance to the command execution pipeline and thus helps the end user to execute code, with confidence.

Example Operating Environment

Figure 4:
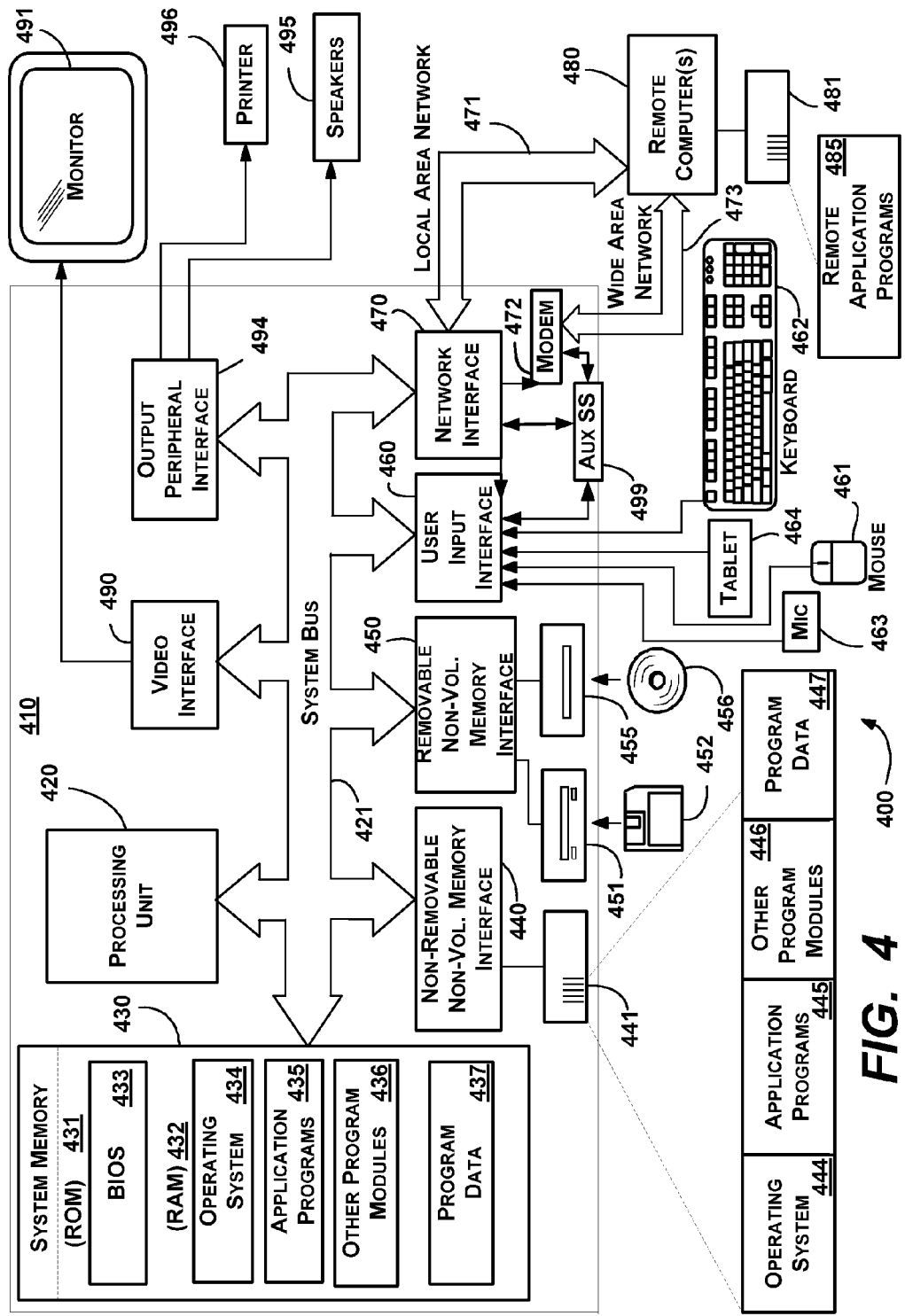
FIG. 4 is a block diagram representing an example computing environment, into which aspects of the subject matter described herein may be incorporated.

FIG. 4 illustrates an example of a suitable computing and networking environment 400 into which the examples and implementations of any of FIGS. 1-3 may be implemented, for example. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the example operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an example system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are examples and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the inten-

What is claimed is:

1. At least one memory storing computer-executable instructions, which upon execution perform operations comprising:
   analyzing an initial program to identify one or more parameters associated with the analyzed initial program;
   based on the one or more identified parameters, generating an intermediary model associated with the initial program, the intermediary model comprising a user interface template corresponding to a user interface of the initial program and a code template associated with the one or more identified parameters;
   receiving an instruction to modify the intermediary model;
   based on the received instruction, modifying the code template of the intermediary model to generate a modified intermediary model comprising the modified code template;
   based on the modified intermediary model, rendering a user interface wizard;
   receiving, at a first transformation program via the rendered user interface wizard, user input associated with at least one parameter;
   inserting the received user input into the modified code template to generate an output; and
   based on the generated output, generating a customized program using a second transformation program.

2. The at least one memory of claim 1 storing further computer-executable instructions, which upon execution perform operations comprising coupling the modified intermediary model to at least one other intermediary model or other modified intermediary model.

3. The at least one memory of claim 1 storing further computer-executable instructions, which upon execution perform operations comprising:
   receiving a first branch parameter that is separate from the one or more identified parameters; and
   based on the first branch parameter, creating a branch condition in the first transformation program.

4. The at least one memory of claim 3 storing further computer-executable instructions, which upon execution perform operations comprising:
   receiving a value associated with the first branch parameter;
   and
based on the received value, identifying a page of a plurality of user interface wizard pages and branching to the identified page.

5. In a computing environment, a method comprising:
   receiving, at a model generator module, an initial program;
   identifying one or more parameters associated with the received initial program;
   based on the one or more identified parameters, generating, at the model generator module, an intermediary model associated with the initial program, the intermediary model comprising a user interface template corresponding to a user interface of the initial program and a code template associated with the one or more identified parameters;
   receiving an instruction to modify the intermediary model;
   based on the received instruction, modifying the code template of the intermediary model to generate a modified intermediary model comprising the modified code template;
   based on the modified intermediary model, rendering, at a model interpreter module, a user interface wizard associated with one or more transformation programs;
   receiving, at a first transformation program of the one or more transformation programs, user input associated with at least one parameter;
   inserting, using the first transformation program, the received user input into the modified code template to generate a first output of the first transformation program; and
   based on the generated first output of the first transformation program, generating a customized program using a second transformation program of the one or more transformation programs.

6. The method of claim 5, wherein receiving the instruction to modify the intermediary model comprises coupling the modified intermediary model to at least one other intermediary model or other modified intermediary model.

7. The method of claim 5, further comprising automatically gathering, at the user interface template, data from a plurality of data sources.

8. The method of claim 5, wherein rendering the user interface wizard comprises enabling a user to extend the modified intermediary model to include a guidance topic or a link to one or more knowledge articles.

9. The method of claim 5, wherein receiving the instruction comprises receiving a first branch parameter, the method further comprising, based on the first branch parameter, creating a branch condition in the first transformation program.

10. The method of claim 9, wherein receiving the user input comprises receiving, at a page of a plurality of user interface wizard pages, a value associated with the first branch parameter.

11. The method of claim 9, wherein receiving the user input comprises receiving a value associated with the first branch parameter, the method further comprising:
   based on the received value, identifying a page of a plurality of user interface wizard pages and branching to the identified page.

12. The method of claim 9, wherein receiving the user input comprises receiving a value associated with the first branch parameter, the method further comprising, based on the received value, branching to one or more other pages of the plurality of user interface wizard pages.

13. The method of claim 9, wherein receiving the instruction further comprises receiving a second branch parameter and a third branch parameter, the method further comprising:
   identifying a page of a plurality of user interface wizard pages corresponding to the second received branch parameter; and
   identifying another page of the plurality of user interface wizard pages corresponding to the third received branch parameter.

14. The method of claim 9, wherein receiving the user input comprises receiving, at a page of a plurality of user interface wizard pages, a value associated with the first branch parameter, the method further comprising:
   executing the second transformation program based on the value associated with the first branch parameter to generate the customized program.

15. A system having a processor and a memory, the system comprising:
- a model generator module stored in the memory and, upon execution by the processor, configured to:
  - receive an initial program to identify one or more parameters associated with the received initial program; and
  - based on the one or more identified parameters, generate an intermediary model associated with the initial program, the intermediary model comprising a user interface template and a code template;
- a model interpreter module stored in the memory and, upon execution by the processor, configured to:
  - receive an instruction to modify the intermediary model; and
  - based on the received instruction, modify the code template of the intermediary model to generate a modified intermediary model comprising the modified code template; and
- a user interface wizard stored in the memory and, upon execution by the processor, configured to:
  - based on the modified intermediary model, render the user interface wizard associated with one or more transformation programs;
  - receive, at a first transformation program of the one or more transformation programs, user input associated with at least one parameter;
  - insert, using the first transformation program, the received user input into the modified code template to generate a first output of the first transformation program; and
  - based on the generated first output of the first transformation program, generate a customized program at a second transformation program of the one or more transformation programs.

16. The system of claim 15, wherein the at least one of the one or more identified parameters comprises a plurality of values.

17. The system of claim 15, wherein the model interpreter module is configured to receive a first branch parameter that is separate from the one or more identified parameters; and
   wherein the user interface wizard is configured to, based on the first branch parameter, create a branch condition in the first transformation program.

18. The system of claim 17, wherein the user interface wizard is configured to receive, at a page of a plurality of user interface wizard pages, a value associated with the first branch parameter.

19. The system of claim 17, wherein the user interface wizard is configured to:
- receive a value associated with the first branch parameter; and
- based on the received value, branch from a page of a plurality of user interface wizard pages to one or more other pages of the plurality of user interface wizard pages.

20. The system of claim 17, wherein the user interface wizard is configured to:
- receive a value associated with the first branch parameter;
- receive, at a second transformation program of the one or more transformation programs, the first output of the first transformation program; and
- execute the second transformation program based on the value associated with the first branch parameter to generate a second output of the second transformation program, wherein the customized program is generated based on the generated second output of the second transformation program.

* * * * *